(12) United States Patent
Noonan

(10) Patent No.: US 6,819,463 B2
(45) Date of Patent: Nov. 16, 2004

(54) ELECTRO-OPTIC PHASE-ONLY SPATIAL LIGHT MODULATOR

(75) Inventor: William A. Noonan, Bethesda, MD (US)

(73) Assignee: Corporation for National Research Initiatives, Reston, VA (US)

( * ) Notice: Subject to any disclaimer, the term of this patent is extended or adjusted under 35 U.S.C. 154(b) by 0 days.

(21) Appl. No.: 10/435,664

(22) Filed: May 12, 2003

(65) Prior Publication Data

US 2004/0008397 A1 Jan. 15, 2004

Related U.S. Application Data

(60) Provisional application No. 60/379,058, filed on May 10, 2002.

(51) Int. Cl.[7] ................................................. G02F 1/03
(52) U.S. Cl. ...................... 359/245; 359/248; 359/260
(58) Field of Search ................................ 359/245, 248, 359/260, 251, 255, 256, 246, 322, 323, 579, 584, 585, 589, 722, 723; 356/245, 454, 519; 372/20, 26, 32

(56) References Cited

U.S. PATENT DOCUMENTS

| | | | |
|---|---|---|---|
| 4,196,396 A | * 4/1980 | Smith | 359/336 |
| 4,221,472 A | * 9/1980 | Smith et al. | 359/260 |
| 5,115,335 A | 5/1992 | Soref | 359/248 |
| 5,221,989 A | * 6/1993 | Stappaerts et al. | 359/323 |
| 5,488,504 A | 1/1996 | Worchesky et al. | 359/248 |
| 6,535,321 B2 | 3/2003 | Wang et al. | 359/260 |

OTHER PUBLICATIONS

H. Sato, "Electro–optic Transform Devices and Their Application", Proc. SPIE, 2647, 110 (1995).

* cited by examiner

*Primary Examiner*—Hung Xuan Dang
*Assistant Examiner*—Tuyen Tra
(74) *Attorney, Agent, or Firm*—Nixon & Vanderhye, P.C.

(57) ABSTRACT

A spatial light modulator is disclosed which includes an electro-optic wafer, such as lithium niobate ($LiNbO_3$) or PLZT, formed as an asymmetric Fabry-Perot cavity with a totally reflecting dielectric mirror on its bottom face and a partially reflecting dielectric mirror on its top face. The electro-optic wafer is sandwiched between a transparent top electrode that forms a solid ground plane and a bottom electrode that is formed on a circuitry wafer and segmented into an array of electrode pads. Voltage source circuitry for each electrode is located immediately beneath the electrode in the circuitry wafer, which is bonded to the electro-optic wafer. Because the bottom electrode is segmented, a different voltage can be applied to each electrode so that the refractive index, and therefore the phase of an exiting light wave, can be spatially modulated.

64 Claims, 4 Drawing Sheets

ELECTRO-OPTIC PHASE-ONLY SPATIAL LIGHT MODULATOR

This application claims the benefit of Provisional Application No. 60/379,058, filed May 10, 2002, the entire contents of which is hereby incorporated by reference in this application.

FIELD OF THE INVENTION

The present invention relates to spatial light modulators, and in particular, to an electro-optic, phase-only spatial light modulator.

BACKGROUND OF THE INVENTION

Spatial light modulators (SLM) have wide application in beam-steering, holographic displays, holographic memory systems, optical information processing, optical correlators and optical pattern recognition. In their most general versions, SLMs can modulate both the amplitude and the phase of an optical wavefront. However, many SLMs modulate either only the amplitude or only the phase. Although they provide less general functionality than amplitude-phase modulation, phase-only SLMs nevertheless have many important uses. For instance, they are used in phase-code multiplexed holographic memories. Phase-only modulation can also provide superior levels of discrimination in optical pattern recognition systems. More generally, the use of phase-only modulators in optical information processing systems result in higher light efficiency, since by definition phase-only masks absorb no light.

Liquid crystal SLMs are the most prevalent and are commercially available. They can provide either amplitude or phase modulation, and they are available with moderately high resolutions ($\geq 512 \times 512$ pixels). Those that are based on nematic liquid crystals have switching speeds limited to 10–20 ms, while smectic liquid crystals SLMs have switching times down to the 100 $\mu$s range.

An emerging technology is the micromirror array and the deformable mirror based on MEMS (micro electromechanical systems). These devices provide phase-only modulation, and, like liquid crystal SLMs, have relatively slow switching speeds.

For fast switching speeds, one must rely on electro-optic SLMs. However most designs for this type of SLM provide only amplitude modulation. Two exceptions are the SLMs based on multiple quantum wells (MQW) described in U.S. Pat. No. 5,115,335 to Soref and U.S. Pat. No. 5,488,504 to Worchesky and Ritter. However, both these devices provide only binary phase-modulation. That is, each pixel can induce only one of two possible phase-shifts in the optical wavefront.

Alternatively, H. Sato, in "Electro-optic Transform Devices and Their Application", *Proc. SPIE*, 2647, p.110 (1995), describes what amounts to a one-dimensional, continuous-phase modulating SLM based on the ferroelectric material PLZT and that is programmed to function as a zoom lens. The construction is extremely simple. The device consists of a PLZT substrate that has transparent electrodes made of indium tin oxide (ITO) deposited on each side. On one side, the electrode forms a solid ground plane, while the electrode on the opposite side is segmented. Each of these electrode segments has a different voltage applied to it. This generates electrostatic fields of differing strengths between the electrode segments and the ground plane. In turn, the refractive index is shifted by differing amounts, and an optical wavefront passing through this device will experience different phase retardations at different locations.

Sato's device consisted of only 25 electrode segments (i.e., pixels), and each electrode was connected separately to an external voltage source. If one were to extend Sato's approach to a high-resolution two-dimensional array of pixels, then wiring each pixel to an external voltage source quickly becomes impractical. Moreover, an increasingly large portion of real estate must be devoted to providing connection leads between the electrodes and the bond pads where the external connections are made. Thus, the electrodes fill less of the SLMs aperture, and the electric fields that determine the refractive index shift are less well controlled.

An obvious solution is to integrate the drive electronics and locate each voltage source immediately behind the corresponding electrode. This way no real estate on the PLZT substrate is taken up with wiring leads to the electrode, and an almost 100% fill factor can be achieved. Unfortunately, Sato's device required that hundreds of volts be applied to the electrodes, and it is not possible to integrate circuitry capable of such high voltage.

On the other hand, this is the approach that Worchesky and Ritter took with their MQW-SLM, which required lower driving voltages. This device has a hybrid construction. The drive electronics and MQW optical layer are fabricated on separate substrates, and then they are bonded together. The MQW layer is segmented into pixels, and each pixel must make an individual electrical connection to its drive circuit on the electronics substrate beneath. Therefore, the two substrates are indium-bump solder bonded together. For a high-resolution device, great care is required to make sure that the substrates are carefully aligned and that good contact is made for each of the many pixels. Unfortunately, this becomes progressively more difficult to do as the number of pixels increases, driving up the manufacturing cost. Moreover, the MQW layer is built up by epitaxially growing over a hundred individual layers, which also increases costs.

U.S. Pat. No. 6,535,321 to Wang and Haertling describes an SLM design that circumvents the integration problems encountered in both Worchesky's and Sato's design approaches. Like Sato, Wang and Haertling use PLZT. However, the required driving voltages are reduced by sandwiching the PLZT layer inside a Fabry-Perot cavity. Wang and Haertling avoid the assembly problem found in Worchesky and Ritter's design by fabricating the integrated drive circuitry on the electronics substrate first, and then depositing the PLZT and the Fabry-Perot cavity mirrors directly on top of the drive circuitry. However, their design is capable of producing amplitude modulation only.

SUMMARY OF THE INVENTION

It is an object of the present invention to provide a fast, electro-optic, phase-only or phase-dominant spatial light modulator.

It is another object of the present invention to provide an electro-optic, phase-only spatial light modulator in which the drive electronics are integrated with the optics of the modulator so as to enable a high pixel density and a high pixel count.

It is a further object of the present invention to provide an electro-optic, phase-only spatial light modulator that is simple to manufacture and that has a lower cost of manufacture.

The present invention is an electro-optic, phase-only or phase-dominant spatial light modulator which is built around an electro-optic wafer, such as lithium niobate (LiNbO$_3$) or lead-lanthanum-zirconate-titanate (PLZT). The electro-optic wafer used in the present invention is sandwiched between parallel conductors. The top electrode is transparent. When a voltage is applied across these conductors, an electrostatic field is generated between the conductors, and the refractive index of the wafer changes.

The spatial light modulator of the present invention also includes a totally reflecting dielectric mirror on the bottom face of the electro-optic wafer and above the bottom electrodes. Since this mirror is non-conducting, it does not interfere with electrostatic field set up between the bottom electrodes and the top ground plane. However, when light is incident from above, it passes through the transparent top electrode and the electro-optic wafer. Then it reflects off the bottom mirror, and exits out the top of the device. Because the application of voltage between electrodes changes the refractive index of wafer, the wavelength of the light inside the wafer is altered. Therefore, the phase of the light wave, at the point it exits the device, also changes.

Because the bottom electrode is segmented, a different voltage can be applied to each electrode. Thus, the refractive index—and therefore the phase of the exiting light wave—can be manipulated to vary with position. In this way, the phase of the outgoing optical wavefront is spatially modulated.

The voltage source circuitry for each electrode is located immediately beneath that electrode. The electronics layer can also include interface logic, which, by way of example:

(a) accepts data from off-chip and changes the state of a single pixel at a time, (b) accepts data serially from off-chip over a period of time for all pixels and then changes the states of all the pixels simultaneously, or (c) contains various pre-set patterns of values for all pixels that can be selected in response to a command signal from off-chip.

This arrangement avoids wiring problems, and the bottom electrodes can fill almost 100% of the aperture of the device.

Depending on thickness and material of the wafer, often anywhere between several hundred and several thousand volts needs to be applied across the wafer to induce a large enough change in refractive index to cause sufficient phase retardation. However, no integrated circuit technology can sustain higher than a few hundred volts, and economical are limited to $\leq 100V$. In these cases, the present invention works with these more modest voltages by enhancing the effect of the resulting small $\Delta n$ by sandwiching the electro-optic wafer inside a Fabry-Perot cavity. Accordingly, a partially reflecting dielectric mirror is deposited on the top face of the wafer. Along with the totally reflecting bottom mirror, it forms an asymmetric Fabry-Perot cavity. The resonance of the Fabry-Perot cavity works to enhance the effect of a small change in the refractive index of the SLM of the present invention. Preferably, dielectric mirrors are used because is possible to get extremely high reflectivities with such mirrors, and because, even at low reflectivities, there is negligible absorption by such mirrors.

The electronics are fabricated on their own separate wafer, typically silicon, with the top metallization layer being used for the bottom electrode pads. The mirrors and top electrode are deposited on the separate electro-optic wafer. Then, the two wafers are bonded together. Because nothing in the optics wafer needs to be segmented, no alignment is needed during bonding. Moreover, no electrical contact is needed, so the wafers can be simply cemented together, which is simple and inexpensive to do.

DETAILED DESCRIPTION OF THE INVENTION

Figure 1:
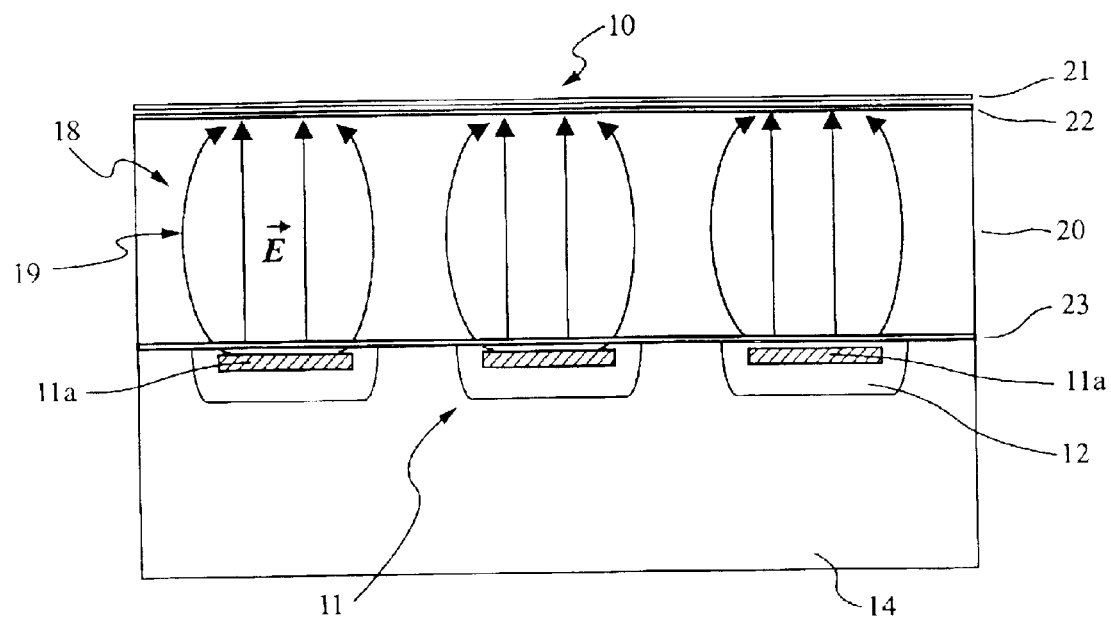
FIG. 1 generally depicts in cross-section the spatial light modulator of the present invention.

The present invention is an electro-optic, phase-only or phase-dominant spatial light modulator 10 that is built around an electro-optic wafer 20. Shown in cross-section in FIG. 1 is a general depiction of spatial light modulator 10 including electro-optic wafer 20. Preferably, electro-optic wafer 20 is lithium niobate (LiNbO$_3$) or lead-lanthanum-zirconate-titanate (PLZT). Other electro-optic materials that might be used to make electro-optic wafer 20 are lithium tantalate (LiTaO$_3$) or barium titanate (BaTiO$_3$). Still other electro-optic materials that might be used to make electro-optic wafer 20 are KDP, KD*P, KTA, RTA, and RTP. Wafer 20 is sandwiched between parallel conductors 11 and 21, which function as electrodes. The top electrode 21 is transparent. When a voltage (not shown) is applied across these conductors, an electrostatic field 19 is generated between the conductors 11 and 21, and the refractive index of the electro-optic wafer 20 changes due to the electro-optic effect.

The spatial light modulator 10 of the present invention also includes a totally reflecting dielectric mirror 23 on the bottom face of the wafer 20 and above the bottom conductor 11. Since this mirror 23 is non-conducting, it does not interfere with electrostatic field 19 set up between the bottom conductor 11 and the top conductor 21. However, when light is incident from above, r it passes through the transparent top electrode 21 and wafer 20. Then it reflects off the bottom mirror 23, and exits out the top of the device 10. Because the application of voltage between electrodes 11 and 21 changes the refractive index of wafer 20, the wavelength of the light inside the wafer 20 is altered. Therefore, the phase of the light wave, at the point it exits the device, also changes.

Because the bottom conductor 11 is segmented into an array of electrodes 11a, a different voltage can be applied to each electrode 11a. Thus, the refractive index, and therefore the phase of the exiting light wave, can be manipulated to vary with position. In this way, the phase of the outgoing optical wavefront is spatially modulated.

The voltage source electronic circuitry 12 for each electrode 11a is located immediately beneath that electrode. The electronics layer 12 can also include interface logic, which, by way of example:

(a) accepts data from off-chip and changes the state of a single pixel at a time, (b) accepts data serially from off-chip over a period of time for all pixels and then changes the states of all the pixels simultaneously, or (c) contains various pre-set patterns of values for all pixels that can be selected in response to a command signal from off-chip. In this way the wiring problem is avoided, and the bottom electrodes 11 can fill almost 100% of the aperture of the device 10. Typically, the voltage source electronic circuitry 12 will be implemented using some form of metal oxide semiconductor (MOS) circuitry.

As shown in FIG. 1, the electronics 12 are fabricated on their own wafer 14, with the top metallization layer 11 of wafer 14 being used for the bottom electrode pads 11a. Typically, wafer 14 will be a silicon wafer. The mirror 23, a partially reflecting mirror 22, and top electrode 21 are deposited on the separate electro-optic wafer 20. Then, the two wafers 20 and 14 are bonded together, as shown in FIG. 1. Because nothing in the optics wafer 20 needs to be segmented, no alignment is needed between wafers 20 and 14 during bonding. Moreover, no electrical contact is needed, so the wafers 20 and 14 can be simply cemented together, which is simple and inexpensive to do.

Depending on the electro-optical wafer material and thickness, between several hundred and several thousand volts are often needed to induce a large enough change in refractive index to cause sufficient phase retardation. However, no integrated circuit technology can sustain higher than a few hundred volts, and economical technologies are limited to $\leq 100V$. In the present invention, this problem is avoided in these cases by enhancing the effect of the resulting small $\Delta n$ by sandwiching the electro-optic wafer 20 inside a Fabry-Perot cavity. Accordingly, a partially reflecting dielectric mirror 22 is deposited on the top face of wafer 20. Along with the totally reflecting bottom mirror 23, it forms an asymmetric Fabry-Perot cavity 18.

Figure 2:
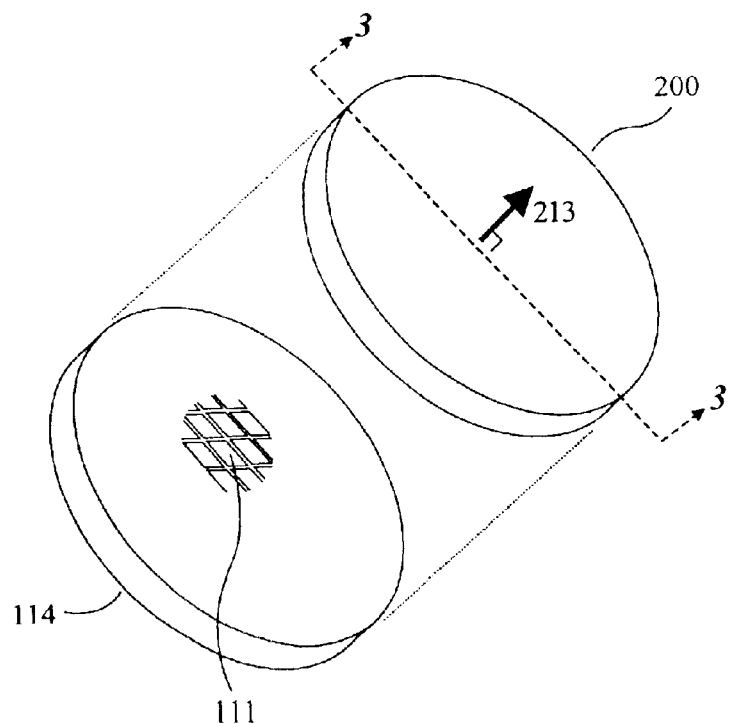
FIG. 2 is an exploded view of the spatial light modulator of the present invention, showing the electro-optic wafer with dielectric mirrors and top electrode and the wafer containing the drive electronics and rear electrodes.
Figure 3:
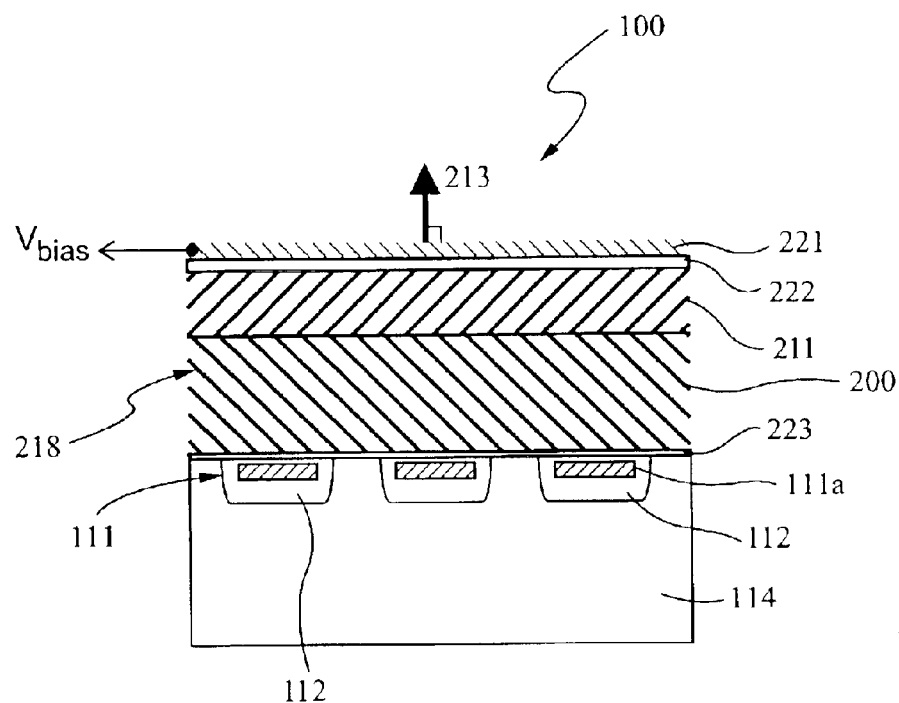
FIG. 3 is a diagram, in cross-section, of the assembled spatial light modulator of the present invention including a Fabry-Perot cavity.

One preferred embodiment of the present invention uses a lithium niobate wafer as the electro-optic medium because it can be readily obtained in wafer form and polished to exacting tolerances by well-established techniques, and because lithium niobate is much less expensive than growing multiple quantum well structures, which are typically used for the electro-optic medium in other SLMs. The completed spatial light modulator 100 of this embodiment is shown in FIG. 3., and an exploded view of SLM 100 is shown in FIG. 2. The electro-optic medium in SLM 100 is a lithium niobate wafer 200 cut such that the optic axis 213 of the lithium niobate crystal is normal to the wafer faces. This wafer is sandwiched between two parallel electrodes 111 and 221. The top conductor 221 is a thin film of sputter deposited indium tin oxide (ITO), and it forms a solid, transparent ground plane. ($V_{bias}$=0 in FIG. 3.) The bottom conductor 111 is metallic, and it is segmented into an array of electrode pads 111a shown in FIG. 3. Each of these bottom electrodes 111a is individually energized by a corresponding electronic voltage source 112 located immediately behind that electrode. The application of a voltage to each of these electrode pads 111a creates a localized electrostatic field between the bottom electrode pad 111a and the top ground plane 221. This field is perpendicular to the electrodes and, via the Pockels effect, induces a change in the refractive index of the sandwiched lithium niobate.

On the bottom face of wafer 200, a totally reflecting dielectric mirror 223 is deposited by standard techniques known to those skilled in the art. A light wave is incident normal to the device from the top. The light wave traverses transparent top electrode 221 and the lithium niobate wafer 200, it reflects off the bottom mirror 223, and finally exits out the top of the device 100. Since the light wave is propagating in the same direction as the optic axis of the lithium niobate crystal, it experiences the ordinary refractive index $n_0$ if no voltage is applied to the electrodes. Thus, the phase-delay suffered by the light waves round-trip through the lithium niobate wafer 200 is $$\phi_o = 4\pi \frac{n_o d}{\lambda_o}, \qquad (1)$$

where d is the thickness of the lithium niobate wafer 200, and $\lambda_0$ is the vacuum wavelength of the incident light. If a voltage is applied to a specific bottom electrode 111a, then the lithium niobate's refractive index is altered in the region between that electrode and the top ground plane. In this geometry, the round trip phase-delay becomes $$\phi = \phi_o - 2\pi \frac{r_{13} n_o^3}{\lambda_o} V, \qquad (2)$$

where $r_{13}$ is the appropriate component from the Pockels coefficient tensor, and V is the applied voltage. Since the voltage V can vary from electrode to electrode, the phase-delay is position dependent, and the phase of the optical wavefront exiting the device is spatially modulated.

The voltage needed to produce a change in the phase-delay of $\pi$ (i.e., the "half-wave voltage") is $$V_\pi = \frac{\lambda_o}{2 r_{13} n_o^3}. \qquad (3)$$

Unfortunately, for lithium niobate, $r_{13}$ is quite small, and the half-wave voltage is awkwardly large. For example at $\lambda_0$=632 nm, $V_\pi$=2.7 kV. Therefore, in this embodiment, the electro-optic medium 200 is sandwiched inside a Fabry-Perot cavity 218 so that small changes in refractive index are enhanced, and $V_\pi$ is reduced to with in the range of a convenient, economical integrated circuit technology.

The Fabry-Perot cavity 218 is created by adding a partially reflecting dielectric mirror 222 over the lithium niobate wafer 200. Together with the totally reflecting bottom mirror 223, it forms the asymmetric Fabry-Perot cavity 218. In principle, the bottom mirror is totally reflecting, so all of the light incident on the completed device is reflected. Therefore, only the phase of the optical wavefront is modulated. However in practice, it is not possible to make an exactly 100% reflecting mirror. There will always be some small amount of loss, so there will be a small attendant amplitude modulation as well.

The integrated voltage source circuitry 112 is implemented in one of several high-voltage integrated circuit technologies, including MOS, bipolar and bipolar/MOS hybrid, that are available from a number of foundries. Generally the more economical integrated circuit processes have lower maximum voltages. Thus there is a trade-off between the rigors fabricating a high-Q Fabry-Perot cavity to accommodate lower driving voltages, versus a less economical but higher voltage integrated circuit process. This circuitry is fabricated on a silicon substrate 120, and it can include interface logic of various possible functionalities. For instance it could:

(a) accept data from off-chip and change the state of a single pixel at a time, (b) accept data serially from off-chip over a period of time for all pixels and then change the states of all the pixels simultaneously, or (c) contain various pre-set patterns of values for all pixels that can be selected in response to a command signal from off-chip. The top metallization layer of the integrated circuit process is used to form the bottom electrode pads 111.

The electronics wafer 114 is fabricated separately from the optics wafer 200 in the manner just discussed. Typically, wafer 114 is silicon, although other appropriate materials for fabricating integrated circuits can be used. The optics wafer 200 is fabricated by starting with the lithium niobate wafer 200 and then depositing the spacer layer 211, the thin film dielectric mirrors 222/223, and the ITO top ground plane 221 by well-established techniques known by those skilled in the art. Then the two wafers 114 and 200 are cemented together. No alignment is necessary, but care must be taken that the two wafers are pressed firmly together so that the gap between the two wafers 114 and 200 is small. If this gap is not small, then the half-wave voltage for SLM 100 will increase. It also opens the possibility that the gap will vary appreciably over the width of the device, which will result in an undesired variation of the half-wave voltage.

Figure 4:
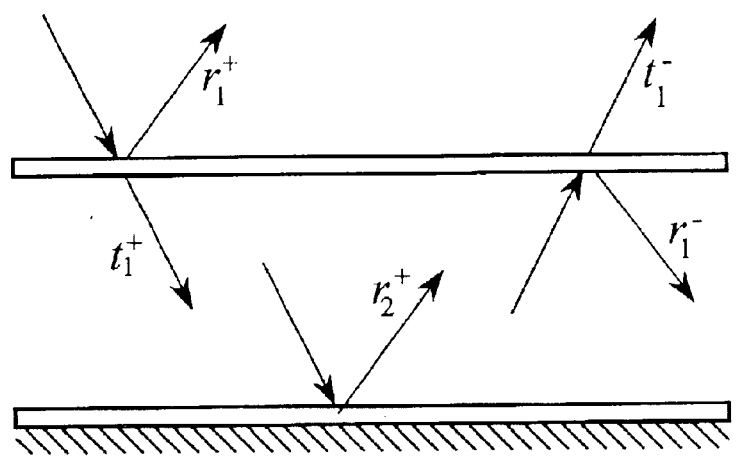
FIG. 4 is an illustration of the notation used for reflection and transmission coefficients.

The SLM 100 of the present invention functions by modulating a reflected optical wavefront. This modulation is imposed by establishing a position dependent reflectivity coefficient over the aperture of the device. The overall reflectivity of a parallel plate Fabry-Perot cavity 218 is given by the well-known formula $$R = r_1^+ + \frac{t_1^+ t_1^- r_2^+ e^{i\phi}}{1 - r_1^- r_2^+ e^{i\phi}}, \quad (4)$$

where $r_1^+$ and $t_1^+$ are the (complex) reflection and transmission coefficients of the top dielectric stack 222 for light incident from above, $r_1^-$ and $t_1^-$ are the coefficients of the top stack for light incident from below, and $r_2^+$ is the reflection coefficient of the bottom stack 223 for light incident from above. (See FIG. 4.) The phase lag $\phi$ is the relative delay suffered by the light during its round-trip propagation through the electro-optic layer 200 and is given by equations (1) and (2). One set of conditions (out of many possibilities) that can produce the desired resonant enhancement is:

(a) $r_1^+ = r_1^-$
(b) $r_{1,2}^+ = -r_{1,2}^-$, where $r_{1,2}^+$ are pure real and $r_{1,2}^+ > 0$ (so there is a 180° phase change upon reflection).
(c) There is no absorption.
(d) The bottom dielectric stack (mirror) is highly reflective, $r_2 = 1 - a \approx 1, \quad a \ll 1,$ so that the complete device acts as a good mirror.
(e) The top mirror is also highly reflective, giving the Fabry-Perot cavity a high Q. But it should also be somewhat less reflective than the bottom mirror, so that the light in the cavity leaks out preferentially in the upward direction. Therefore, we want $r_1 = r_2 - \delta, \quad 0 \leq \delta \ll 1.$ All of these conditions are met by the classic (H L)$^P$H quarter-wave dielectric stack. In this special case, the reflectivity for the complete system becomes $$R = -\frac{1 - a - \delta - (1-a)e^{i\phi}}{1 - (1-a)(1-a-\delta)e^{i\phi}} \quad a, \delta \ll 1. \quad (5)$$

Figure 5A:
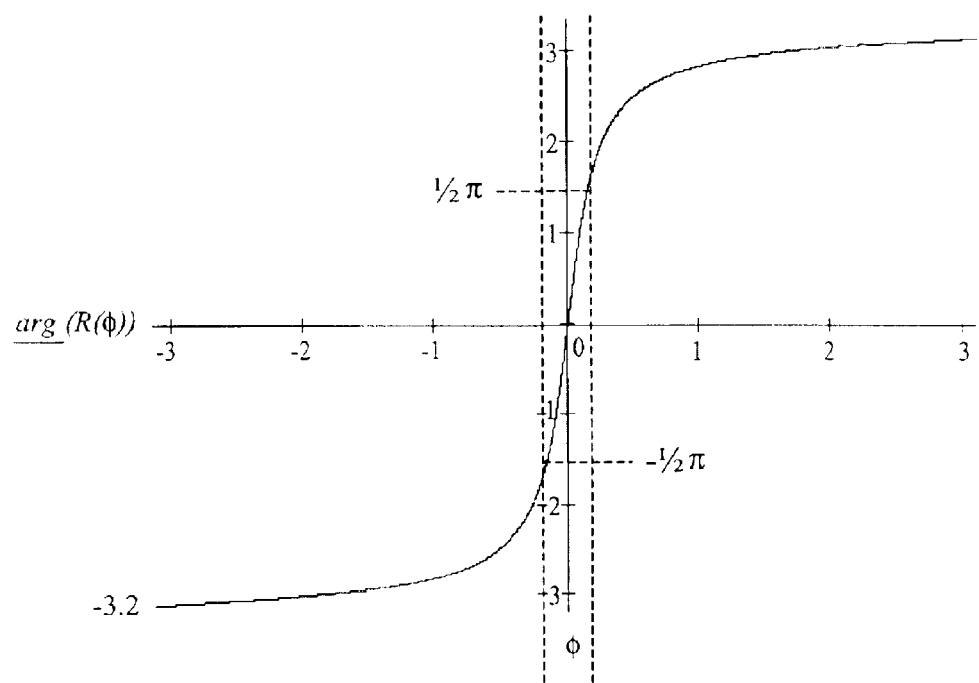
FIG. 5 shows plots of arg(R) and |R| versus $\phi$ (round-trip phase lag in the cavity).

For light impinging on the completed system, the phase shift induced upon reflection is simply arg(R), and the device's insertion loss is $|R|$. As voltage is applied, the refractive index of the electro-optic layer changes, altering $\phi$ proportionately. Both arg(R) and $|R|$ are plotted versus $\phi$ in FIGS. 5a & 5b. (a=0.01 and δ=0.15 are used for illustration; smaller values would be used in practice.) Notice that arg(R) changes from $-\frac{1}{2}\pi$ to $+\frac{1}{2}\pi$ over a very narrow range of $\phi$. Thus this arrangement can be used to construct a phase modulator with a $\pm\frac{1}{2}\pi$ range that requires only small changes in refractive index. In order to get the $\pm\frac{1}{2}\pi$ phase shift, the refractive index needs to change only by $$\Delta n \cong \frac{\lambda_o}{d} \frac{\sqrt{\delta(2a+\delta)}}{4\pi}. \quad (6)$$

Figure 5B:
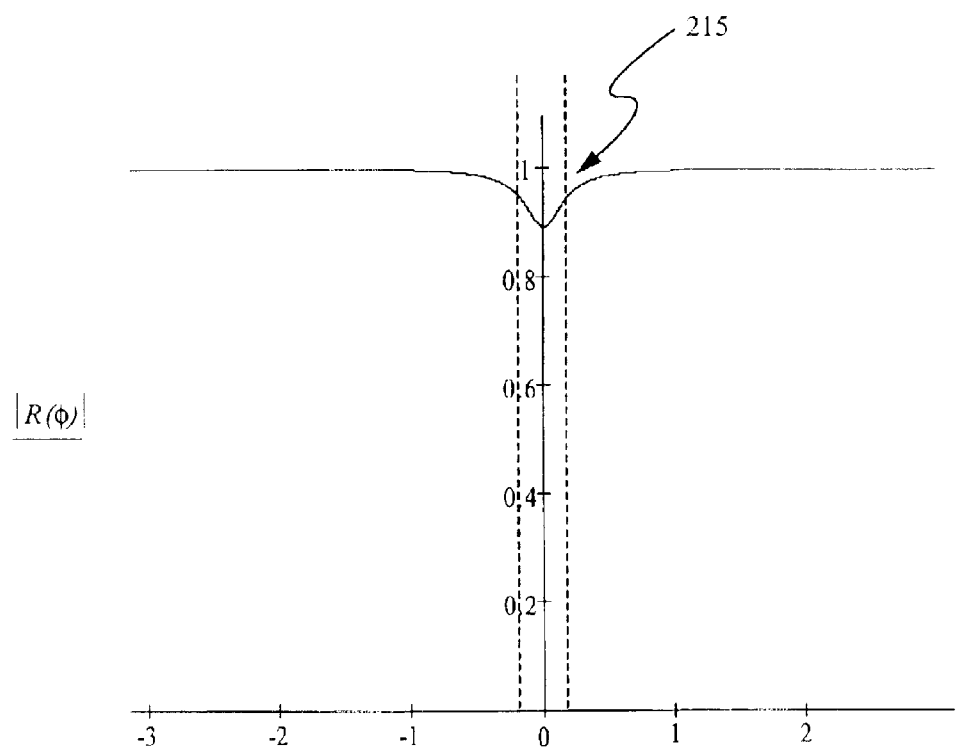

FIG. 5b shows that there is some loss ($|R|<1$) and that this loss is not quite constant. However both these effects can be minimized by making a and δ small, i.e., by making the end mirrors highly reflective. This will also have the benefit of reducing the required $\Delta n$ (see Eqn. (6)).

A drawback of the resonant enhancement produced by the Fabry-Perot cavity 218 is an extreme sensitivity to the precise thickness and flatness of the lithium niobate wafer. As illustrated in FIG. 5b—and as desired—there is a narrow sweet spot 215 where small changes in the round-trip phase-delay $\phi$ produce large changes in the phase of the reflected light, arg(R). Clearly, the zero-voltage phase-delay $\phi_0$ needs to be either zero or an even multiple of $\pi$, where $$\phi_o = 4\pi \frac{n_o d}{\lambda_o}.$$

Therefore, small errors in the lithium niobate wafer thickness d can push the device completely outside this sweet spot 215. Thus, the wafer 200 must have a precisely trimmed average thickness and the thickness must be very uniform over the aperture of the SLM 100. In turn, the uniformity requirement means that the two wafer faces must be very flat and parallel to each other.

In order to make $\phi_0$ precisely equal to an even multiple of $\pi$, the Fabry-Perot cavity width d is "trimmed" by depositing an extra spacer layer 211. This layer should consist of a material that whose refractive index is as close as possible to lithium niobate's ordinary refractive index $n_0$. For instance, at an operating wave length of $\lambda_0 \cong 1\ \mu m$, tantalum pentoxide ($Ta_2O_5$) is a possible choice. As the spacer layer is deposited, its thickness is monitored in situ by established optical techniques known to those skilled in the art. When the total optical thickness, nd, of the lithium niobate wafer and the spacer together is an exact multiple of the operating wavelength $\lambda_0$, the deposition is terminated.

The finite thickness of the lithium niobate wafer has another deleterious effect. Each electrode pad 111a represents a finite aperture. Therefore, when light reflects off it, the reflected wavefront spreads diffractively. By the time the reflected wavefront reaches the front of the cavity, it will have spread to some extent into neighboring pixels. This "blooming" results in a slight loss of resolution. The thicker the lithium niobate wafer, the more the reflected wavefront spreads. In general, the amount of the diffractive spread is a function of the Fresnel number for the pixel:

$$N_F = \frac{4\omega^2}{\lambda_o d}, \quad (7)$$

where w is the pixel width. For instance with circular electrode pads, the fraction of power lost to the pixel due to diffractive spreading is approximately $0.2\, N_F^{-1.4}$. Depending on the tolerance for blooming, the lithium niobate wafer may be made thinner, if necessary. If the desired thickness is not commercially available, a thicker wafer can always be polished down.

The dielectric mirrors are designed for the desired reflectivity coefficients using established techniques familiar to those skilled in the art. Furthermore, the design of the top, partially reflecting mirror 222 must take into account the effects of the overlying ITO layer 221 and the fact that the underlying spacer layer 211 does not have precisely the same refractive index as lithium niobate.

The present invention works in the reflective mode. Furthermore, it needs to be operated at near-normal incidence if the incident polarization is to be preserved. If the angle of incidence is not nearly perpendicular, an appreciable component of the incident light wave's electric vector will fall along the lithium niobate crystal's optic axis, and this component will experience the extraordinary refractive index $n_e$ instead of the ordinary index $n_0$. Therefore the polarization of the reflected light will be altered due to birefringence. However, if the incident light is linearly polarized parallel to the device's surface, this will not occur and the device can be operated at off-normal angles of incidence.

There is also the issue that dielectric mirrors have different reflectivities for s- and p-polarizations with oblique angles of incidence. However there exist techniques, known to those skilled in the art, for designing mirrors with no difference in these reflectivities at a specified design angle.

As illustrated by FIG. 5b, the useful "phase-stroke" of the spatial light modulator 10 of the present embodiment is limited to about $\pm\frac{1}{2}\pi$. Nevertheless there are many applications where this is sufficient.

As an alternative preferred embodiment the electro-optic wafer 200 can be composed of lead-lanthanum-zirconate-titanate (PLZT) instead of LiNbO$_3$. Whereas, lithium niobate's refractive index varies linearly with the applied electric field (the Pockels effect), PLZT's refractive index varies quadratically (the Kerr effect). Therefore the application of voltage V across the thickness of the wafer changes its refractive index to $$n(V) = n_o - \frac{1}{2} n_o^3 s_{13} \left(\frac{V}{d}\right)^2, \quad (8)$$

where $s_{13}$ is an element from quadratic electro-optic coefficient tensor and $n_0$ is zero-field refractive index. Since the PLZT wafer is encased in the same Fabry-Perot cavity, its refractive index must change by $$\pm \Delta n \cong \frac{\lambda_o}{d} \frac{\sqrt{\delta(2a+\delta)}}{4\pi}$$

in order to modulate the device's output by $\pm\frac{1}{2}\pi$ as before. Thus the required change in voltage, $\Delta V$, is given by $$\frac{\lambda_o}{d} \frac{\sqrt{\delta(2a+\delta)}}{4\pi} \cong \Delta n \cong \frac{dn}{dV}\bigg|_{V_o} \Delta V = \frac{n_o^3 s_{13}}{d^2} V_o \Delta V. \quad (9)$$

So, $$\Delta V = \frac{\lambda_o d}{4\pi n_o^3 s_{13} V_o} \sqrt{\delta(2a+\delta)} \quad (10)$$

Therefore, unlike the lithium niobate embodiment, the required driving voltage is a function of both the wafer thickness d and the presence of a bias voltage $V_0$ across the PLZT wafer 220. (Note that equation (10) is only valid if $\Delta V \ll V_0$.)

Equation (10) shows that when using a quadratic electro-optic material as in the PLZT embodiment of the current invention, the driving voltage, $\Delta V$, can be reduced not only by increasing the Q of the Fabry-Perot cavity, but also by making the wafer thinner or by applying a large dc-bias, $V_0$, across the wafer. Employing these two new strategies allows the use of a lower-Q Fabry-Perot cavity. In turn, this relaxes the need for fabricating very high reflectivity mirrors and for having very flat and parallel PLZT wafer faces. Additionally, these strategies can be used to lower the magnitude of the driving voltage, $\Delta V$, to where a more economical integrated circuit process can be used to fabricate the voltage source circuitry 112.

The application of the dc-bias is easily accomplished by merely connecting the ITO layer 221 to a high-voltage source instead of ground. ($V_{bias} = V_0$ in FIG. 3.) Although this will require an external voltage source, this is not a burden, because only one source is needed and it only needs to be a dc-source.

Figure 6:
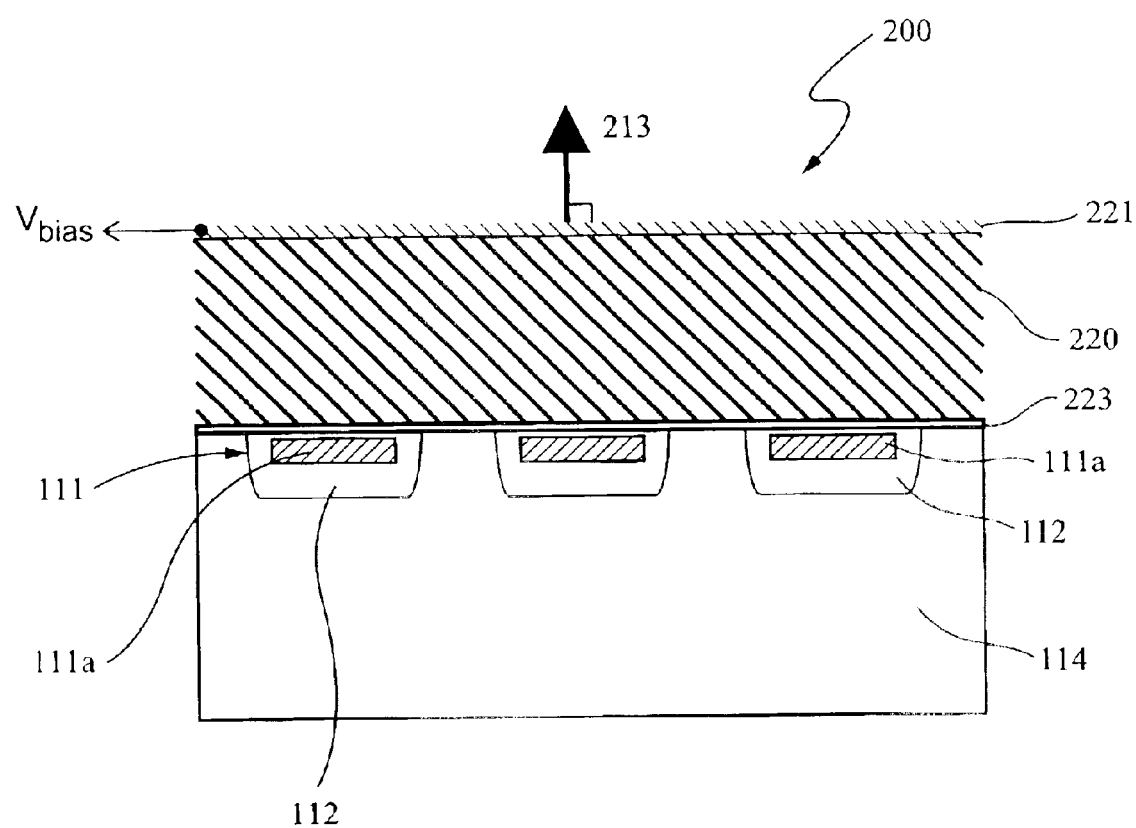
FIG. 6 is a diagram, in cross-section, of the assembled spatial light modulator of the present invention without a Fabry-Perot cavity.

For PLZT, the quadratic electro-optic coefficient $s_{13}$ is so large that it is practical to eliminate the Fabry-Perot cavity 218 altogether. (See FIG. 6.) Therefore, the top dielectric mirror 222 is not needed, and it may be eliminated as shown in FIG. 6. In this alternative preferred embodiment, a dc-bias of $V_0$ is applied to the ITO layer 221, and driving voltages ranging between $\pm\Delta V$ are applied to the bottom electrode pads 111a. Furthermore, it is possible to get a full $2\pi$ range in relative phase-shift of the light reflected from the device. To get this $2\pi$ range, the dc-bias and the driving voltage range must satisfy $$V_o \Delta V \geq \frac{\lambda_o d}{4 n_o^3 s_{13}}. \quad (11)$$

Since there is no reliance on resonance, as when a Fabry-Perot cavity is used, there is no need to tune the electro-optic layer 200 to be an exact multiple of wavelengths thick. Consequently there is no need for a spacer layer 211, and it may also be eliminated, as shown in FIG. 6.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

What is claimed is:

1. A spatial light modulator comprising:
   a first wafer that is formed from an electro-optic material,
   a partially reflecting dielectric mirror deposited on the top of the first wafer,
   a transparent conductor formed on top of the partially reflecting dielectric mirror,
   a totally reflecting dielectric mirror formed on the bottom face of the first wafer, wherein the first wafer is sandwiched between the totally reflecting bottom dielectric mirror and the partially reflecting dielectric mirror so as to form an asymmetric Fabry-Perot cavity,
   a second wafer,
   a metal conductor formed on top of the second wafer, the metal conductor being segmented into a plurality of electrodes, and
   a plurality of electronic voltage sources formed in the second wafer, each electronic voltage source being located next to a corresponding electrode and applying a voltage between the corresponding electrode and the transparent conductor, the first and second wafers being bonded to one another without being aligned with respect to one another in a predetermined manner.

2. The spatial light modulator recited in claim 1, wherein the electro-optic material is a linear electro-optic material.

3. The spatial light modulator recited in claim 2, wherein the transparent electrode forms a solid ground plane.

4. The spatial light modulator recited in claim 1, wherein the electro-optic material is a quadratic electro-optic material.

5. The spatial light modulator recited in claim 4, wherein the transparent electrode forms a solid ground plane.

6. The spatial light modulator recited in claim 4, wherein a bias voltage is applied between each of the electrodes and the transparent conductor.

7. The spatial light modulator recited in claim 1, wherein the electro-optic material is lithium niobate ($LiNbO_3$).

8. The spatial light modulator recited in claim 1, wherein the electro-optic material is lead-lanthanum-zirconate-titanate (PLZT).

9. The spatial light modulator recited in claim 1, wherein the electro-optic material is selected from the group consisting of lithium tantalate ($LiTaO_3$) and barium titanate ($BaTiO_3$).

10. The spatial light modulator recited in claim 1, wherein the electro-optic material is selected from the group consisting of KDP, KD*P, KTA, RTA, and RTP.

11. The spatial light modulator recited in claim 1, wherein each electronic voltage source forms an electrostatic field between its corresponding electrode and the transparent conductor.

12. The spatial light modulator recited in claim 11, wherein the dielectric mirrors are non-conducting so as to not interfere with the electrostatic field between each electrode and the transparent conductor.

13. The spatial light modulator recited in claim 1, wherein integrated circuit technology used to fabricate the electronic voltage sources is selected from the group consisting of MOS, bipolar and bipolar/MOS hybrid.

14. The spatial light modulator recited in claim 13, wherein a top metallization layer of the integrated circuit process is used to form the plurality of electrodes.

15. The spatial light modulator recited in claim 1, wherein the electrostatic field being formed between each electrode and the transparent conductor results in a change in a refractive index of the first wafer.

16. The spatial light modulator recited in claim 1, wherein light incident on the top of the asymmetric Fabry-Perot cavity is reflected with a phase-shift, the size of this phase-shift being a function of the change in the refractive index of the electro-optic wafer induced by a plurality of voltages applied between the electrodes and the transparent conductor.

17. The spatial light modulator recited in claim 1, wherein different voltages are applied between the electrodes and the transparent conductor, whereby the refractive index, and therefore the phase of an exiting light wavefront, can be manipulated to vary with position.

18. The spatial light modulator recited in claim 1, wherein the transparent conductor is indium tin oxide (ITO).

19. The spatial light modulator recited in claim 1 further comprising a trimming layer sandwiched between the first wafer and the partially reflecting dielectric mirror for precisely controlling the spacing between the partially reflecting dielectric mirror and the totally reflecting dielectric mirror, both dielectric mirrors being highly reflective, whereby the Fabry-Perot cavity has a high-Q.

20. The spatial light modulator recited in claim 19, wherein the trimming layer is a material with a refractive index that is close to lithium niobate's ordinary refractive index.

21. The spatial light modulator recited in claim 19, wherein the trimming layer is tantalum pentoxide ($Ta_2O_5$).

22. The spatial light modulator recited in claim 19, wherein the trimming layer is sized to trim the width of the Fabry-Perot cavity so that the Fabry-Perot cavity has a round trip zero-voltage phase-delay equal to an even multiple of $\pi$.

23. The spatial light modulator recited in claim 1, wherein each electrode is a pixel of the spatial light modulator, and wherein the spatial light modulator further comprises interface logic circuitry fabricated on the second wafer (1) that accepts data from off-chip to change the state of a single pixel at a time, (2) that accepts data from off-chip serially over a period of time for all pixels and then change the states of all the pixels simultaneously, and/or (3) that contains various pre-set patterns of values for all pixels that can be selected in response to a command signal from off-chip.

24. The spatial light modulator recited in claim 1, wherein the first wafer has a thickness selected to avoid blooming.

25. The spatial light modulator recited in claim 1, wherein, at a specified design angle, the dielectric mirrors have no difference in their reflectivities for s-polarizations and p-polarizations.

26. The spatial light modulator recited in claim 1, wherein each electronic voltage source located next to a corresponding electrode is positioned under the corresponding electrode.

27. An electro-optic spatial light modulator comprising:
an electro-optic wafer,
a partially reflecting dielectric mirror deposited on the top face of the electro-optic wafer,
a transparent electrode formed on top of the partially reflecting dielectric mirror,
a totally reflecting dielectric mirror formed on the bottom face of the electro-optic wafer, wherein the electro-optic wafer is sandwiched between the totally reflecting bottom mirror and the partially reflecting dielectric mirror so as to form an asymmetric Fabry-Perot cavity,
a circuitry wafer,
a metal conductor formed on top of the circuitry wafer, the metal conductor being segmented into an array of electrode pads, and
a plurality of electronic voltage sources formed in the circuitry wafer, each electronic voltage source being located behind a corresponding electrode pad so as to eliminate a need for connection leads between the electrode pads and external voltage sources, each electronic voltage source also applying a voltage between the corresponding electrode pad and the transparent conductor,
wherein the electro-optic wafer and the circuitry wafer are bonded without being aligned with respect to one another in a predetermined manner.

28. The spatial light modulator recited in claim 27, wherein the electro-optic material is a linear electro-optic material.

29. The spatial light modulator recited in claim 28, wherein the transparent electrode forms a solid ground plane.

30. The spatial light modulator recited in claim 27, wherein the electro-optic material is a quadratic electro-optic material.

31. The spatial light modulator recited in claim 30, wherein the transparent electrode forms a solid ground plane.

32. The spatial light modulator recited in claim 27, wherein the electro-optic wafer is lithium niobate ($LiNbO_3$).

33. The spatial light modulator recited in claim 27, wherein the electro-optic wafer is lead-lanthanum-zirconate-titanate (PLZT).

34. The spatial light modulator recited in claim 27, wherein the electro-optic material is selected from the group consisting of lithium tantalate ($LiTaO_3$) and barium titanate ($BaTiO_3$).

35. The spatial light modulator recited in claim 27, wherein the electro-optic material is selected from the group consisting of KDP, KD*P, KTA, RTA, and RTP.

36. The spatial light modulator recited in claim 27, wherein each electronic voltage source forms an electrostatic field between its corresponding electrode pad and the transparent conductor.

37. The spatial light modulator recited in claim 36, wherein the dielectric mirrors are non-conducting so as to not interfere with the electrostatic field between each electrode pad and the transparent conductor.

38. The spatial light modulator recited in claim 36, wherein the electrostatic fields being formed between the electrode pads and the transparent conductor results in a change in the refractive index of the electro-optic wafer.

39. The spatial light modulator recited in claim 27, wherein integrated circuit technology used to fabricate the electronic voltage sources is selected from the group consisting of MOS, bipolar and bipolar/MOS hybrid.

40. The spatial light modulator recited in claim 39, wherein a top metallization layer of an integrated circuit process is used to form the plurality of electrode pads.

41. The spatial light modulator recited in claim 27, wherein light incident on the top of the asymmetric Fabry-Perot cavity is reflected with a phase-shift, the size of this phase-shift being a function of the change in the refractive index of the electro-optic wafer induced by a plurality of voltages applied between the electrodes and the transparent conductor.

42. The spatial light modulator recited in claim 27, wherein different voltages are applied between the electrode pads and the transparent conductor, whereby the refractive index, and therefore the phase of an exiting light wavefront, can be manipulated to vary with position.

43. The spatial light modulator recited in claim 27, wherein a bias voltage is applied between each of the electrode pads and the transparent conductor.

44. The spatial light modulator recited in claim 27, wherein the transparent conductor is indium tin oxide (ITO).

45. The spatial light modulator recited in claim 27 further comprising a trimming layer sandwiched between the electro-optic wafer and the partially reflecting dielectric mirror for precisely controlling the spacing between the partially reflecting dielectric mirror and the totally reflecting dielectric mirror, both dielectric mirrors being highly reflective, whereby the Fabry-Perot cavity has a high-Q.

46. The spatial light modulator recited in claim 45, wherein the trimming layer is a material with a refractive index that is close to lithium niobate's ordinary refractive index.

47. The spatial light modulator recited in claim 45, wherein the trimming layer is tantalum pentoxide ($Ta_2O_5$).

48. The spatial light modulator recited in claim 45, wherein the trimming layer is sized to trim the width of the Fabry-Perot cavity so that the Fabry-Perot cavity has a round trip zero-voltage phase-delay equal to an even multiple of it.

49. The spatial light modulator recited in claim 27, wherein each electrode pad is a pixel of the spatial light modulator, and wherein the spatial light modulator further comprises interface logic circuitry fabricated on the circuitry wafer (1) that accepts data from off-chip to change the state of a single pixel at a time, (2) that accepts data from off-chip serially over a period of time for all pixels and then change the states of all the pixels simultaneously, and/or (3) that contains various pre-set patterns of values for all pixels that can be selected in response to a command signal from off-chip.

50. The spatial light modulator recited in claim 27, wherein the electro-optic wafer has a thickness selected to avoid blooming.

51. The spatial light modulator recited in claim 27, wherein, at a specified design angle, the dielectric mirrors have no difference in their reflectivities for s-polarizations and p-polarizations.

52. The spatial light modulator recited in claim 27, wherein each electronic voltage source located behind a corresponding electrode is positioned under the corresponding electrode.

53. An electro-optic spatial light modulator comprising:
    an electro-optic wafer formed from lead-lanthanum-zirconate-titanate (PLZT),
    a transparent electrode formed on top of the electro-optic wafer,
    a totally reflecting dielectric mirror formed on the bottom face of the electro-optic wafer,
    a silicon wafer,
    a metal conductor formed on top of the silicon wafer, the metal conductor being segmented into an array of electrode pads, and
    a plurality of electronic voltage sources formed in the silicone wafer, each electronic voltage source being located next to a corresponding electrode pad and being applied between the corresponding electrode pad and the transparent electrode,
    wherein the electro-optic wafer and the silicon wafer are bonded together without being aligned with respect to one another in a predetermined manner.

54. The spatial light modulator recited in claim 53, wherein each electronic voltage source forms an electrostatic field between its corresponding electrode pad and the transparent conductor.

55. The spatial light modulator recited in claim 53, wherein integrated circuit technology used to fabricate the electronic voltage sources is selected from the group consisting of MOS, bipolar and bipolar/hybrid.

56. The spatial light modulator recited in claim 55, wherein a top metallization layer of an integrated circuit process is used to form the plurality of electrode pads.

57. The spatial light modulator recited in claim 53, wherein the electrostatic fields being formed between the electrode pads and the transparent conductor results in a change in the refractive index of the electro-optic wafer.

58. The spatial light modulator recited in claim 53, wherein different voltages are applied between the electrode pads and the transparent conductor, whereby the refractive index, and therefore the phase of an exiting light wavefront, can be manipulated to vary with position.

59. The spatial light modulator recited in claim 53, wherein a bias voltage is applied between each of the electrode pads and the transparent electrode.

60. The spatial light modulator recited in claim 59, wherein the electro-optic wafer has a large quadratic electro-optic coefficient, and wherein a large dc-bias voltage is applied between the transparent electrode and each of the electrode pads, whereby reduced voltages can be applied between the electrode pads and the transparent conductor.

61. The spatial light modulator recited in claim 53, wherein the transparent electrode forms a ground plane.

62. The spatial light modulator recited in claim 53, wherein the transparent conductor is indium tin oxide (ITO).

63. The spatial light modulator recited in claim 53, wherein each electrode pad is a pixel of the spatial light modulator, and wherein the spatial light modulator further comprises interface logic circuitry fabricated on the circuitry wafer (1) that accepts data from off-chip to change the state of a single pixel at a time, (2) that accepts data from off-chip serially over a period of time for all pixels and then change the states of all the pixels simultaneously, and/or (3) that contains various pre-set patterns of values for all pixels that can be selected in response to a command signal from off-chip.

64. The spatial light modulator recited in claim 53, wherein each electronic voltage source located next to a corresponding electrode is positioned under the corresponding electrode.

* * * * *